US009152569B2

(12) United States Patent
Li et al.

(10) Patent No.: US 9,152,569 B2
(45) Date of Patent: Oct. 6, 2015

(54) NON-UNIFORM CACHE ARCHITECTURE (NUCA)

(75) Inventors: Jian Li, Austin, TX (US); Ramakrishnan Rajamony, Austin, TX (US); William E. Speight, Austin, TX (US); Xiaoxia Wu, State College, PA (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 12/264,682

(22) Filed: Nov. 4, 2008

(65) Prior Publication Data

US 2010/0115204 A1 May 6, 2010

(51) Int. Cl.

*G06F 12/02* (2006.01)
*G06F 12/08* (2006.01)
*G06F 12/12* (2006.01)

(52) U.S. Cl.

CPC ........ *G06F 12/0897* (2013.01); *G06F 12/0811* (2013.01); *G06F 12/0846* (2013.01); *G06F 12/0848* (2013.01); *G06F 12/123* (2013.01); *G06F 2212/225* (2013.01); *G06F 2212/271* (2013.01)

(58) Field of Classification Search

CPC . G06F 9/5061; G06F 9/5077; G06F 12/0846; G06F 12/0848; G06F 17/30584; G06F 2212/282; G06F 2212/72–2212/7204; G06F 2212/7206; G06F 2212/7208

USPC .................................... 711/12, 129, 170–173

See application file for complete search history.

(56) References Cited

U.S. PATENT DOCUMENTS 5,361,391 A * 11/1994 Westberg ...................... 711/137
5,710,907 A * 1/1998 Hagersten et al. ............ 711/148
6,112,267 A * 8/2000 McCormack et al. .......... 710/52
6,128,094 A * 10/2000 Smith .......................... 358/1.15
6,243,794 B1 * 6/2001 Casamatta .................... 711/153
2002/0029326 A1 * 3/2002 Reuter et al. .................. 711/206
2003/0137873 A1 * 7/2003 Kawamura ............... 365/185.11
2004/0205296 A1 * 10/2004 Bearden ........................ 711/129
2006/0080506 A1 * 4/2006 Rajamony et al. ............ 711/119
2006/0179244 A1 * 8/2006 Goodman et al. ............ 711/141
2007/0292992 A1 * 12/2007 Best ............................. 438/121
2008/0010414 A1 * 1/2008 Kailas et al. .................. 711/133
2008/0040554 A1 * 2/2008 Zhao et al. .................... 711/133
2008/0126716 A1 * 5/2008 Daniels ......................... 711/154
2008/0215800 A1 * 9/2008 Lee et al. ...................... 711/103
2009/0043831 A1 * 2/2009 Antonopoulos et al. ...... 707/205

(Continued)

OTHER PUBLICATIONS

Kim et al., Energy-Efficiient File Placement Techniques for Heterogeneous Mobile Storage Systems, Oct. 25, 2006, EMSOFT '06, pp. 171-177.*

(Continued)

*Primary Examiner* — Aimee Li
*Assistant Examiner* — Nicholas Simonetti
(74) *Attorney, Agent, or Firm* — Russell Ng PLLC; Libby Z. Toub

(57) ABSTRACT

In one embodiment, a cache memory includes a cache array including a plurality of entries for caching cache lines of data, where the plurality of entries are distributed between a first region implemented in a first memory technology and a second region implemented in a second memory technology. The cache memory further includes a cache directory of the contents of the cache array and a cache controller that controls operation of the cache memory.

28 Claims, 5 Drawing Sheets

Begin 500
Receive memory access request 502
Hit? 504 No Yes
Load? 510 No Yes
Allocate entry in frequently read region and, if necessary, perform castout 512
Allocate entry in frequently written region and, if necessary, perform castout 514
Request target cache line 516
Place target cache line in allocated entry & initialize saturating counter to 11b 518
LD from frequently read region or ST to frequently written region? 520 Yes No
Access data & increment saturating counter 522
Access data & decrement saturating counter 524
MSB = 0? 526 No Yes
Select a line in other region and swap; initialize both saturating counters 528
End 530

(56) References Cited

U.S. PATENT DOCUMENTS

| | | | | |
|---|---|---|---|---|
| 2009/0300269 | A1* | 12/2009 | Radke et al. | 711/103 |
| 2009/0327584 | A1* | 12/2009 | Tetrick et al. | 711/103 |

OTHER PUBLICATIONS

Bondurant et al., "MRAM—The Future of Non-Volatile Memory?," Jul. 2008, Portable Design, Retrieved Jun. 3, 2013.*

Dong et al., "Circuit and Microarchitecture Evaluation of 3D Stacking Magnetic RAM (MRAM) as a Universal Memory Replacement," Jun. 8-13, 2008, ACM, DAC 2008.*

Grupp et al., "Characterizing Flash Memory: Anomalies, Observations, and Applications," Dec. 12-16, 2009, ACM, MICRO '09.*

Super Talent Technology Inc., "SLC vs. MLC: An Analysis of Flash Memory," Supter Talent Technology Inc., Retrieved Jun. 3, 2013.*

Desikan et al., "On-chip MRAM as a High-Bandwidth, Low-Latency Replacement for DRAM Physical Memories", Sep. 27, 2002, Department of Computer Sciences at The University of Texas at Austin, Tech Report TR-02-47.*

Merriam-Webster, Definition: 'Increment', http://www.merriam-webster.com/dictionary/increment, Retrieved May 13, 2015.*

Changkyu Kim, et al. "An adaptive, non-uniform cache structure for wire-delay dominated on-chip caches," ASPLOS 2002.

Jaehyuk Huh, et al. "A NUCA substrate for flexible CMP cache sharing," IEEE TPDS, vol. 18, No. 8, Aug. 2007.

Enric Gibert, Jaume Abella, Jesus Sanchez, Xavier Vera and Antonio Gonzalez. "Variable-based multi-module data caches for clustered VLIW processors," PACT 2005.

Jaume Abella and Antonio Gonzalez. "Power efficient data cache designs," ICCD 2003.

Changkyu Kim, Doug Burger, Stephen W. Keckler, "NUCA: A Non-Uniform Cache Access Architecture for Wire-Delay Dominated On-Chip Caches", MICRO 2004.

Harvard architecture in IBM Automatic Sequence Controlled Calculator (ASCC), a.k.a., Harvard Mark-I (1944), p. 68-69 of "Computer Architecture—A quantitative approach" by John L. Hennessy and David A. Patterson, 3rd Edition.

Hsien-Hsin S Lee and Gary S. Tyson. "Region-based caching: an energy-delay efficient memory architecture for embedded processors," CASES'00, Nov. 17-18, 2000, San Jose, CA.

Antonio Gonzalez, Carlos Aliagas and Mateo Valero. "A data cache with multiple caching strategies tuned to different types of locality," ICS 1995.

Beckmann, et al; "Managing Wire Delay in Large Chip-Multiprocessor Caches"; Computer Sciences Dept; University of Wisconson-Madison. Dec. 4-8, 2004.

Chisti, et al; "Distance Associativity for High-Performance Energy-Efficient Non-Uniform Cache Architectures"; School of Electrical and Computer Engineering, Purdue University. Dec. 3-5, 2003.

Dybdahl, et al; "An Adaptive Shared/Private NUCA Cache Partitioning Scheme for Chip Multiprocessors" Norwegian Univ. of Sci. & Technol., Trondheim. Feb. 10-14, 2007.

Foglia, et al; "A NUCA Model for Embedded Systems Cache Design"; IEEE 0-7803-9347-3; pp. 109-116. Sep. 22-23, 2005.

Bilardi, et al; "Optimal Organizations for Pipelined Hierarchical Memories"; SPAA '02; ACM 1-58113-529-7/02/0008; Aug. 10, 2002.

Kwon, et al; "A Scalable Memory System Design"; IEEE 0-8186-7755-4/96; IEEE; 1996; pp. 257-260; 10th International Conference on VLSI Design. Jan. 4-7,1997.

Dickinson, et al; "A Systolic Architecture for High Speed Pipelined Memories"; IEEE 1063-6404; pp. 406-409. Oct. 3-6, 1993.

Muralimanohar, et al; "Optimizing NUCA Organizations and Wiring Alternatives for Large Caches With CACTI 6.0" Dec. 1-5, 2007.

Patti, Robert S., "Three-Dimensional Integrated Circuits and the Future of System-on-Chip Designs." Proceedings of the IEEE, vol. 94, No. 6, Jun. 2006.

* cited by examiner

NON-UNIFORM CACHE ARCHITECTURE (NUCA)

This invention was made with Government support under DARPA, PERCS Phase III. THE GOVERNMENT HAS CERTAIN RIGHTS IN THIS INVENTION.

BACKGROUND OF THE INVENTION

1. Technical Field

The present invention relates in general to data storage, and in particular, to a cache memory having a non-uniform cache architecture (NUCA).

2. Description of the Related Art

A conventional multiprocessor computer system includes multiple processing units all coupled to a system interconnect. Coupled to the system interconnect is a system memory, which represents the lowest level of volatile memory in the multiprocessor computer system and is generally is accessible for read and write access by all processing units. In order to reduce access latency to instructions and data residing in the system memory, each processing unit is typically further supported by a respective multi-level cache hierarchy for temporarily storing instructions and data retrieved from the system memory.

In current large-scale computer systems, it is common to use "deep" cache hierarchies, with small and fast L1 caches implemented, for example, in Static Random Access Memory (SRAM) and with multiple larger and slower lower level caches implemented, for example, in Embedded Dynamic Random Access Memory (EDRAM). Conventional "deep" cache hierarchies are characterized by significant cache management overhead (e.g., to manage coherency across all levels of the hierarchy), high latency access to lower levels of the cache hierarchy, and storage inefficiency in that a single multi-level cache hierarchy may hold multiple copies of a same cache line.

In an attempt to improve upon conventional "deep" cache hierarchies, a number of Non-Uniform Cache Architectures (NUCAs) have been proposed. In general, a NUCA flattens the conventional multi-level cache hierarchy by using a fewer numbers of cache hierarchy levels with a large number of banks of the same memory technology (e.g., SRAM, EDRAM, etc.) in each level of the cache hierarchy. As a consequence of the physical structure of such cache architectures, entries in different banks of the same cache memory have non-uniform access times dependent on physical position, giving rise to the term NUCA.

Various new cache management policies have been proposed for NUCA caches, including static NUCA (S-NUCA) and dynamic NUCA (D-NUCA). In an S-NUCA cache, data are statically allocated to the cache banks (e.g., based upon index bits of memory addresses) and remain in the allocated banks until deallocated. In contrast, a D-NUCA cache permits data to reside in different banks and employs a migration mechanism to move data among the banks to reduce wire delay effects. For example, in a D-NUCA cache employing generational promotion, the storage locations or entries comprising each congruence class are ranked by access latency, and upon access a cache line in a congruence class is promoted to the next lower latency entry of that congruence class and demoted to a higher latency entry as other cache lines in the congruence class are accessed.

SUMMARY OF THE INVENTION

In one embodiment, a cache memory includes a cache array including a plurality of entries for caching cache lines of data, where the plurality of entries are distributed between a first region implemented in a first memory technology and a second region implemented in a second memory technology. The cache memory further includes a cache directory of the contents of the cache array and a cache controller that controls operation of the cache memory.

BRIEF DESCRIPTION OF THE DRAWINGS

The following detailed description will best be understood by reference to the accompanying drawings, wherein.

DETAILED DESCRIPTION OF ILLUSTRATIVE EMBODIMENT

Figure 1:
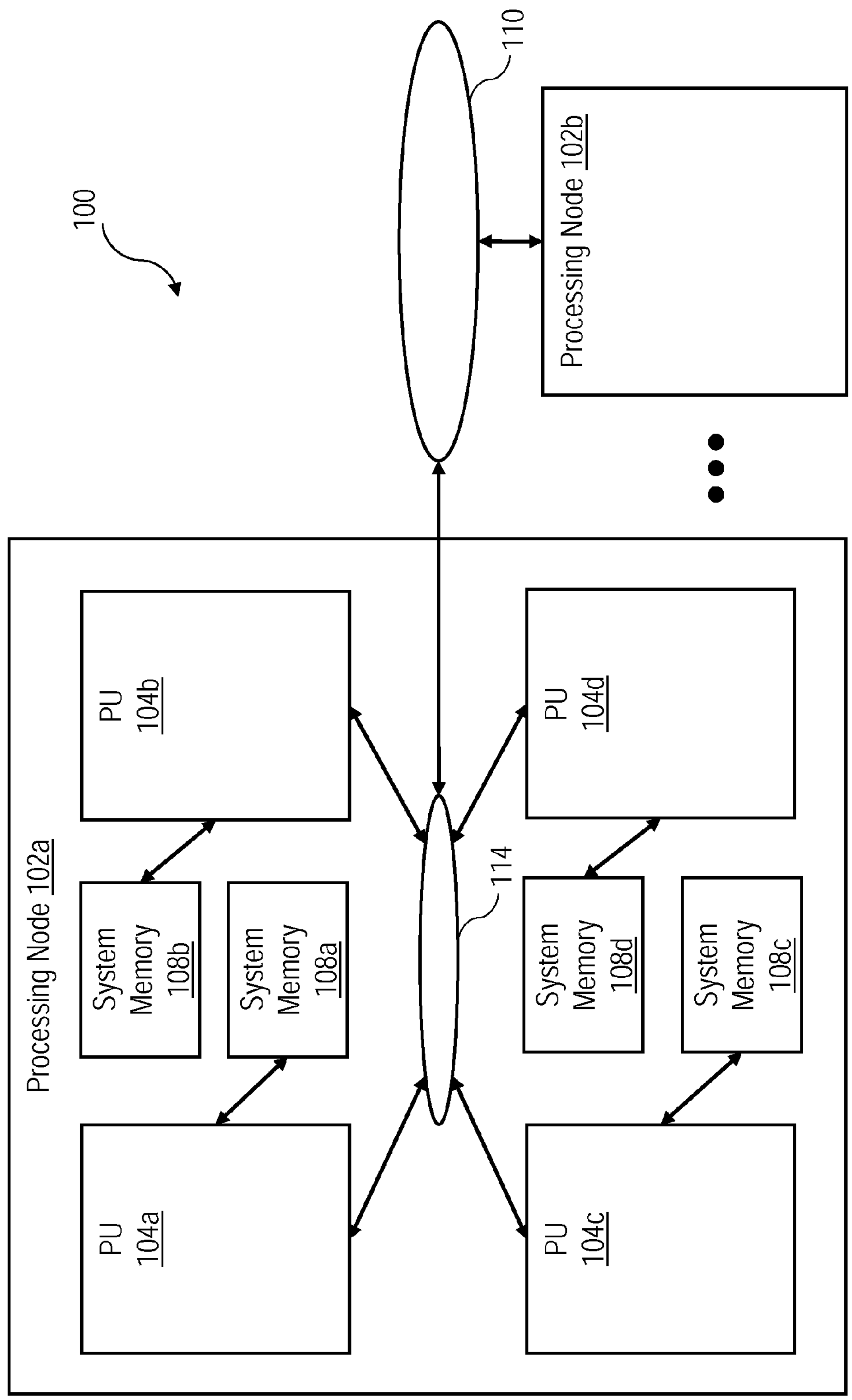
FIG. 1 is a high level block diagram of an exemplary multiprocessor data processing system in accordance with one embodiment.

With reference now to the figures and, in particular, with reference to FIG. 1, there is illustrated a high level block diagram of an exemplary embodiment of a multiprocessor data processing system employing NUCA. As shown, data processing system 100 includes one or more processing nodes 102 (in this case, at least processing nodes 102*a* and 102*b*) for processing data and instructions. Processing nodes 102*a*, 102*b* are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104*a*-104*d*, each preferably realized as a respective integrated circuit. The processing units 104*a*-104*d* within each processing node 102 are coupled for communication by a local interconnect 114, which, like system interconnect 110, may be implemented with one or more buses and/or switches. Local interconnects 114 and system interconnect 110 together form an interconnect fabric.

The devices coupled to each local interconnect 114 include not only processing units 104, but also one or more system memories 108*a*-108*d*. Data and instructions residing in system memories 108 can generally be accessed and modified by a processor core 202 (FIG. 2A) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements disclosed herein are applicable to data processing systems of diverse architectures and are in no way limited to the generalized multiprocessor data processing system architecture illustrated in FIG. 1.

Figure 2C:
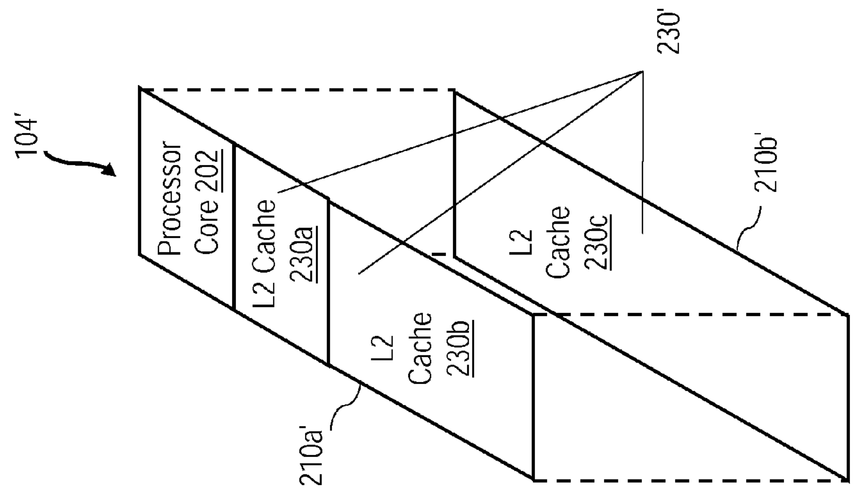
FIGS. 2B-2C depict alternative physical implementations of the processing unit illustrated n FIG. 2A.
Figure 2B:
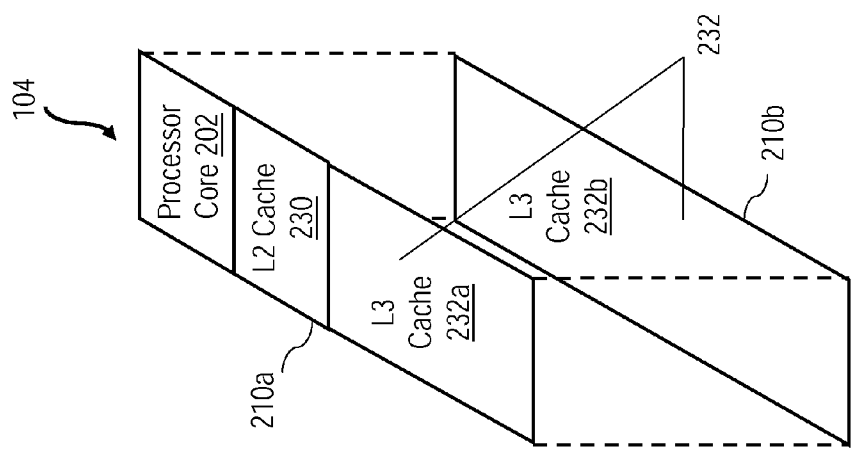
Figure 2A:
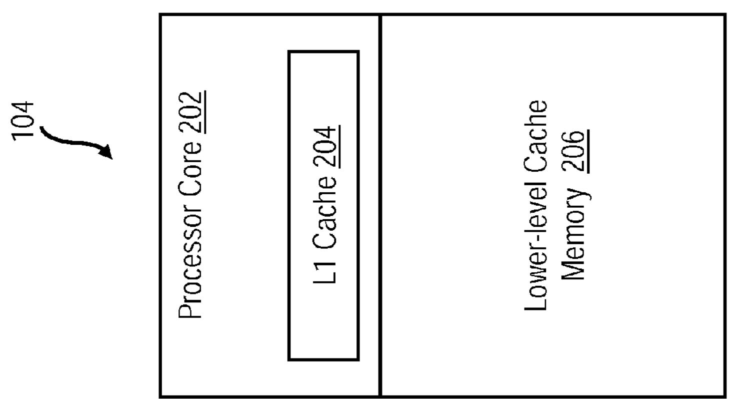
FIG. 2A is a high level block diagram of an exemplary embodiment of a processing unit from FIG. 1.

Referring now to FIG. 2A, there is depicted a more detailed block diagram of an exemplary processing unit 104 in accordance with the present invention. In the depicted embodiment, each processing unit 104 includes, inter alia, at least one processor core 202 (and possibly many) that contains circuitry for processing instructions and data and a cache memory hierarchy that provides low latency access to memory-mapped data and instructions, which may be initially retrieved, for example, from system memories 108. It will be appreciated that processing unit 104 may also include other unillustrated circuitry, such as an integrated memory controller that controls access to one or more of the system memories 108*a*-108*d*, an input/output (I/O) controller, and interconnect interface logic, etc., as is known in the art.

The cache memory hierarchy of each processing unit 104 includes a level one (L1) cache 204 within each processor core 202 as well as lower-level cache memory 206, which may contain one or more additional lower levels of cache memory. For example, depending upon the desired implementation, lower-level cache memory 206 may include a level two (L2) cache 230 as well as additional levels (L3, L4, L5, etc.) of on-chip or off-chip in-line or lookaside cache, which may be fully inclusive, partially inclusive, or non-inclusive of the contents the upper levels of cache. Further, any of the various levels of the cache hierarchy may be private to a particular processor core 202 or shared by multiple processor cores 202. For example, in some implementations, the cache hierarchy includes L1 and L2 caches for each processor core 202, with multiple L2 caches sharing a common L3 cache. In a preferred embodiment, at least one (and possibly each) level of cache memory is implemented with a NUCA.

Referring now to FIG. 2B, there is depicted a partially exploded view of a three-dimensional (3D) physical realization of an exemplary processing unit 104 implementing a NUCA in accordance with one embodiment. In the depicted embodiment, the integrated circuit chip of processing unit 104 is fabricated utilizing 3D chip integration and has multiple physical layers, including at least an upper (possibly top) layer 210*a* and a lower layer 210*b*. The various physical layers can be fabricated with heterogeneous process and/or circuit technologies, and thus may have differing speeds, densities, latencies, power requirements, and reliabilities. In the depicted example, top layer 210*a*, which is characterized by faster signal speeds, includes processor core 202 (containing L1 cache 204), L2 cache 230, and a first smaller portion or "tile" 232*a* of an L3 cache 232. Lower layer 210*b*, which is characterized by slower signal speeds, contains a second larger tile 232*b* of L3 cache 232. Thus, a single cache, in this case L3 cache 232, spans multiple physical layers of an integrated circuit chip, and each tile or portion of the cache can optionally be implemented with heterogeneous process and/or circuit technologies (e.g., SRAM in 22 nm technology, EDRAM in 32 nm technology, Magnetoresistive Random Access Memory (MRAM), and/or Phase-change memory (PCM), etc.). It should be understood that 3D integration facilitates fabrication of heterogeneous technologies with possibly lower cost than a conventional two-dimensional (2D) implementation; however, the invention discussed herein is also applicable to conventional 2D integration.

With reference now to FIG. 2C, there is illustrated a partially exploded view of a 3D physical realization of an exemplary processing unit 104' implementing a NUCA in accordance with another embodiment. In the illustrated embodiment, the integrated circuit chip comprising processing unit 104' is fabricated utilizing 3D chip integration and has at least an upper (possibly top) layer 210*a'* and a lower layer 210*b'*. Again, as noted above, the various physical layers of processing unit 104' can be fabricated with heterogeneous process and/or circuit technologies, and thus may have differing speeds, densities, latencies, power requirements, and reliabilities. In the depicted example, top layer 210*a'*, which is characterized by faster signal speeds, includes processor core 202 (containing L1 cache 204), a first tile 230*a* of an L2 cache 230', and a second larger tile 230*b* of L2 cache 230'. Lower layer 210*b'*, which is characterized by slower signal speeds, contains a still larger third tile 230*c* of L2 cache 230'. Thus, L2 cache 230', comprising tiles 230*a*, 230*b*, and 230*c*, spans multiple physical layers of the integrated circuit chip of processing unit 104, and tiles 230*a*-230*c* can optionally be implemented with heterogeneous process and/or circuit technologies (e.g., SRAM, EDRAM, MRAM, and/or PCM, etc.).

With the multi-level and/or heterogeneous technology NUCA caches disclosed herein, cache management policies are preferably implemented to leverage the selected architecture for efficient operation. In general, it is desirable to place each cache line of data in a storage location optimized according to at least one metric, where the metric may optionally be dependent upon the type or characteristics of data. For example, if latency in general is the metric of choice, a cache management policy can be to allocate and optionally move frequently accessed lines to the faster cache tile(s) (i.e., the tile(s) that have lower access latency by virtue of physical chip layer in which the tile(s) reside or the memory technology). Alternatively or additionally, the access latency can be optimized based upon data type, for example, by allocating and optionally moving frequently-read cache lines to read-efficient cache tile(s) and/or by allocating and optionally moving frequently-written cache lines to write-efficient cache tile(s). Alternatively or additionally, the cache utilization can be optimized based upon data criticality, for example, by allocating and optionally moving mission critical data to cache tile(s) implemented in the most reliable memory technology (e.g., solid state memory). Alternatively or additionally, cache utilization can be optimized based upon data set size, for example, by allocating and optionally moving large temporarily unused data sets (e.g., inactive virtual machines) to cache tile(s) implemented in a high-density memory technology, such as PCM.

Figure 3:
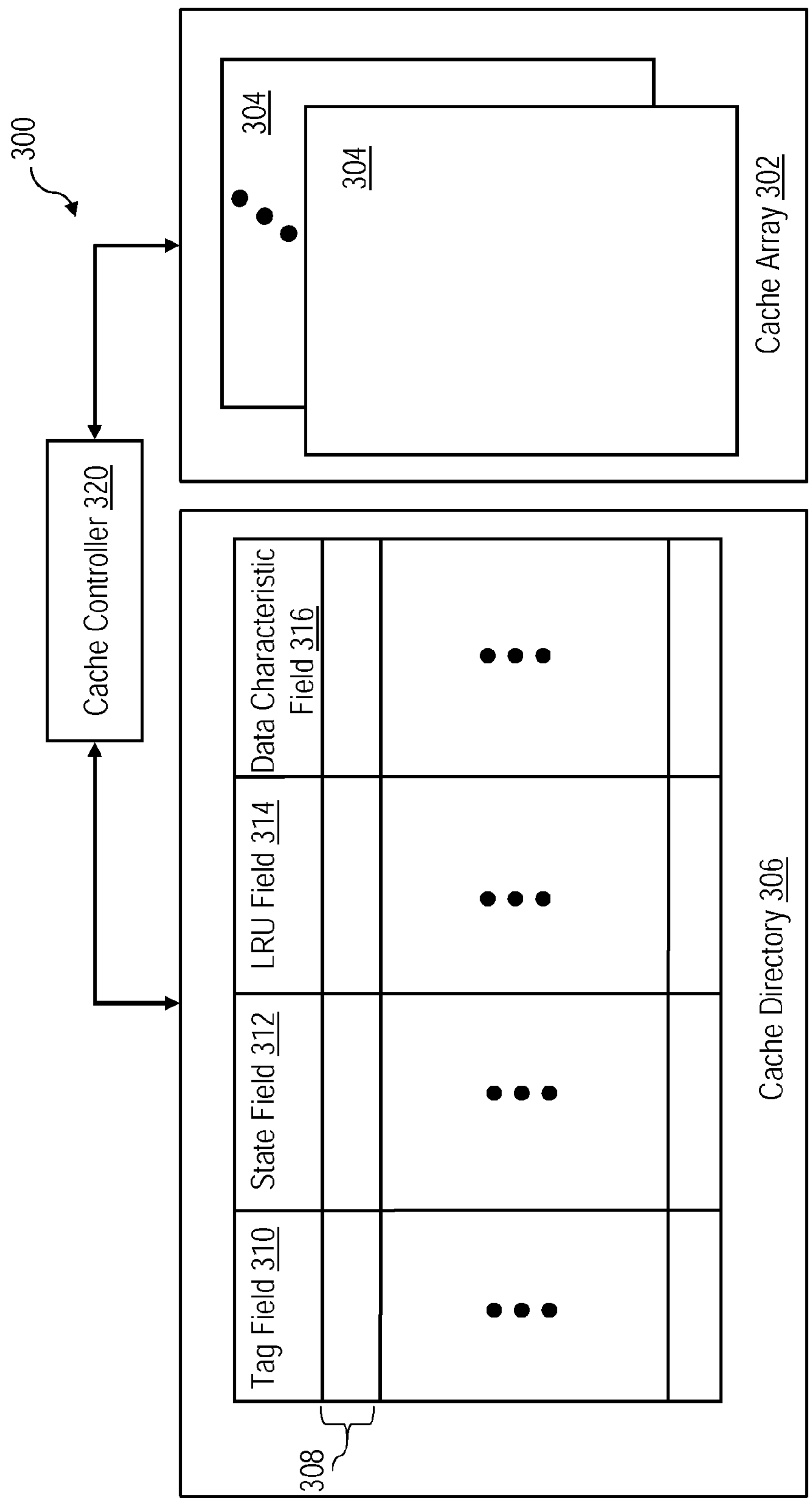
FIG. 3 is a high level block diagram of a cache having a Non-Uniform Cache Architecture (NUCA) in accordance with at least one embodiment.

Referring now to FIG. 3, there is depicted a high level block diagram of an exemplary embodiment of a cache memory 300 that may be utilized to implement L2 cache 230 or L3 cache 232 from FIGS. 2B-2C. As shown, cache memory 300 includes a cache array 302 including at least two (and possibly numerous) tiles 304. As described above, at least two of tiles 304 are located on different physical layers of the integrated circuit chip and/or are implemented with heterogeneous process and/or circuit technologies. In a typical implementation, data are organized within cache memory 300 in a set-associative fashion, with multiple congruence classes (ways) established based upon index bits of memory addresses and multiple entries (e.g., 4, 8 or 16) for storing cache lines of data within each congruence class. It should be noted that congruence classes can be constructed independently of the tiling of cache array 302, meaning that the entries comprising any given congruence classes may be spread across two or more of tiles 304.

Cache memory 300 further includes a cache directory 306. Cache directory 306 records the particular cache lines stored within cache array 302 utilizing one directory entry 308 for each cache line in cache array 302. In the depicted embodiment, each directory entry 308 in cache directory 306 comprises at least a tag field 310, which specifies the particular cache line stored in cache array 302 utilizing a tag portion of the corresponding address, a LRU (Least Recently Used) field 312 indicating an access chronology for the cache line with respect to other cache lines in the same congruence class, and a state field 314, which indicates the coherence state (also referred to as cache state) of the cache line. In addition, each directory entry 308 includes a data characteristic field 316. In a preferred embodiment, data characteristic field 316 holds information regarding the characteristic(s) of the data comprising the associated cache line so that the physical distribution of data within cache memory 300 can be intelligently managed to leverage the non-uniform characteristics of tiles 304, as described further below.

As further shown in FIG. 3, cache memory 300 further includes a cache controller 320. Cache controller 320 manages the contents of cache array 302 and cache directory 306 and responds to data requests and coherency operations. In a preferred embodiment, cache controller 320 allocates cache lines within tiles 304, and optionally migrates the cache lines among tiles 304, in order to take advantage of the non-uniform characteristics of tiles 304.

Figure 4:
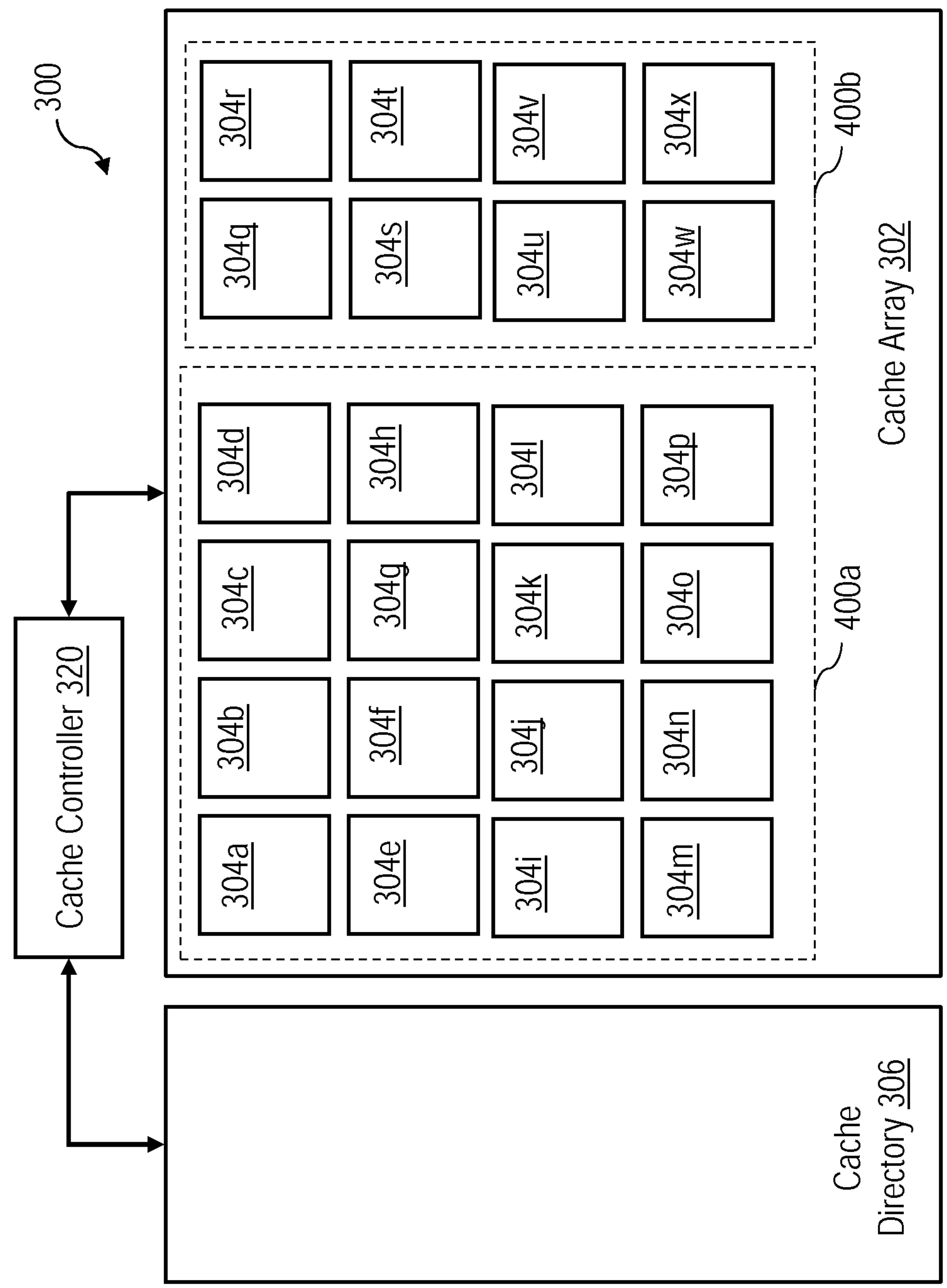
FIG. 4 is a high level block diagram of one implementation of a NUCA cache containing heterogeneous regions for caching read-often cache lines and write-often cache lines.

With reference now to FIG. 4, there is illustrated a high level block diagram of an exemplary implementation of a NUCA cache memory 300 in accordance with one embodiment. As indicated by like reference numerals, NUCA cache memory 300 is generally constructed as discussed above with reference to FIG. 3.

In the implementation shown in FIG. 4, cache array 302 includes twenty-four tiles 304*a*-304*x*, where sixteen tiles 304*a*-304*p* form a frequently read region 400*a* for caching frequently read cache lines and eight tiles 304*q*-304*x* form a frequently written region 400*b* for caching frequently written cache lines. In order to leverage the non-uniform cache architecture of cache memory 300, frequently read region 400*a* can be implemented with a first memory technology, such as MRAM, and frequently written region 400*b* can be implemented with a different second memory technology, such as SRAM. Table I below summarizes the approximate relative characteristics of SRAM and MRAM given current process technology.

TABLE I

| Characteristic | SRAM | MRAM |
|---|---|---|
| Cell Density | 1 | 4 |
| Read Latency | 1 | 1 |
| Write Latency | 1 | 5 |
| Dynamic Power (Read) | 1 | 1 |
| Dynamic Power (Write) | 1 | 10 |
| Static Power | 1 | 0 |

As indicated, MRAM has approximately four times the cell density of SRAM, has equivalent read latency, equivalent dynamic power on read accesses, and no static power consumption. Accordingly, it is advantageous if frequently read cache lines are primarily cached in MRAM. However, because of the far higher latency and power consumption of MRAM for write accesses, it is preferable if frequently written cache lines are primarily cached in SRAM.

In some implementations, the assignment of tiles 304 to the various different regions of NUCA cache 300 is statically determined, for example, by hardware design or by a setting established, for example, at system startup. In other embodiments, the various different regions can be dynamically sized by cache controller 320. For example, in the implementation of FIG. 4, frequently read region 400*a* can be expanded to include one or more of tiles 304*q*-304*x* or frequently written region 400*b* can be expanded to include one or more of tiles 304*a*-304*p*. Cache controller 320 can determine the dynamic allocation between regions 400*a*-400*b*, for example, based on the runtime ratio of read and write accesses to cache memory 300, or alternatively, can simply allow the allocation to be established over time by allocating frequently read cache lines beginning in the lower latency tiles 304 and frequently written lines beginning in the higher latency tiles 304.

It should further be appreciated that the implementation of regions 400*a*-400*b* can alternatively or additionally be segregated in different physical layers of the integrated circuit chip or can span multiple physical layers of the integrated circuit chip. Thus, all of tiles 304*a*-304*p* can be within the same physical layer (which can be the same or a different layer than contains one or more of tiles 304*q*-304*x*) or one or more of tiles 304*a*-304*p* can be fabricated within a different physical layer than the others (which can be the same or a different layer than contains one or more of tiles 304*q*-304*x*). For example, in one embodiment, frequently read region 400*a* is implemented in a lower latency physical layer (e.g., upper layer 210*a*) to accelerate performance-critical read requests, and frequently written region 400*b* is implemented in a higher latency physical layer (e.g., lower layer 210*b*).

In at least some embodiments, cache directory 306 is implemented in a different region 400 than some or all of the tiles 304 implementing cache array 302. For example, in some embodiments, cache directory 306 is implemented in a first region optimized (in terms of physical layer and/or memory and/or process technology) for directory access, while at least some of tiles 304 reside in one or more other regions.

Figure 5:
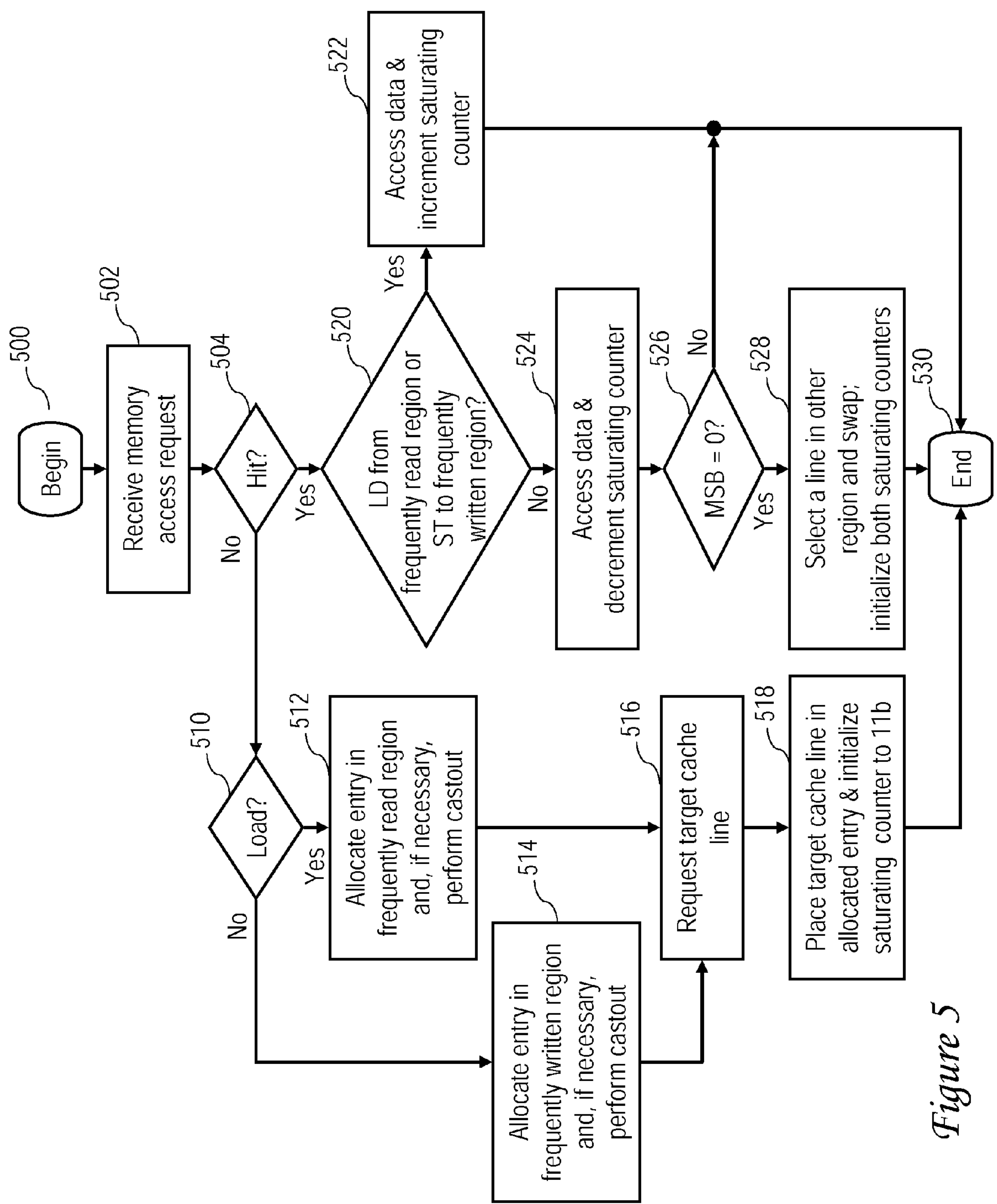
FIG. 5 is a high level logical flowchart of an exemplary process for managing the exemplary NUCA cache illustrated in FIG. 4.

Referring now to FIG. 5, there is depicted a high level logical flowchart of an exemplary process for managing the exemplary implementation of NUCA cache memory 300 illustrated in FIG. 4. As a logical rather than chronological flowchart, at least some of the blocks illustrated in FIG. 5 can be performed in parallel or in a different order than that illustrated. The exemplary process shown in FIG. 5 assumes an implementation of data characteristic field 316 in cache directory 306 as a two-bit saturating counter indicating the read and write frequency of the associated cache line. Of course, in other embodiments, data characteristic field 316 may be implemented with a different number of bits or bits signifying information other than a count value.

As shown, the process of FIG. 5 begins at block 500 and then proceeds to block 502, which illustrates cache controller 320 receiving from the associated processor core 202 a memory access request, such as a request for non-modifying access (considered to be a load access) or a request for modifying access (considered to be a store access). The memory access request specifies a target address (e.g., a real address) of a cache line to be accessed by the memory access request. In response to the memory access request, cache controller 320 accesses cache directory 306 to determine if the target cache line associated with the target address resides in cache array 302, as indicated at block 504. If cache directory 306 indicates that the target cache line resides in cache array 302, a hit occurs, and the process proceeds to block 520, which is described below. If, however, cache directory 306 indicates that the target cache line does not reside in cache array 302, a miss occurs, and the process passes to block 510.

Block 510 depicts cache controller 320 selecting one of regions 400*a*-400*b* to hold the target cache line based upon the type of the memory access request. If the memory access request is a load access, cache controller 320 allocates an entry of cache array 302 in frequently read (e.g., MRAM) region 400*a* and a corresponding entry 308 in cache directory 306 for the target cache line, as depicted at block 512. Alternatively, if the memory access request is a store access, cache controller 320 allocates an entry of cache array 302 in frequently written (e.g., SRAM) region 400*b* and a corresponding entry 308 in cache directory 306 for the target cache line, as illustrated at block 514.

As will be appreciated, the allocation of the entry in cache array 302 as shown at blocks 512 and 514 entails the application of a replacement policy to select a victim entry in the congruence class to which the index of the target memory address maps, for example, based upon the LRU fields 316 and/or data characteristic fields 318 of the entries 308 of the congruence class. In one replacement policy, cache controller 320 examines a pool of two or more less recently used entries and selects the lowest latency entry in the pool as the victim entry on a load miss and the highest latency entry in the pool as the victim entry on a store miss. In an alternative replacement policy, cache controller 320 selects as the victim entry the least recently used entry in frequently read region 400*a* on a load miss and the least recently used entry in frequently written region 400*b* on a store miss. In at least cases in which the cache line in the victim entry is modified with respect to system memory 108, the existing cache line in the victim entry is castout (i.e., written back) to lower level cache or system memory 108.

As indicated at block 516, cache controller 320 also requests the target cache line of the memory access request, for example, from a lower level cache memory in the same memory hierarchy, from another cache hierarchy (e.g., via the interconnect fabric), or from system memory 108. When the target cache line is received, cache controller 320 places the target cache line of the memory access request in the allocated entry of cache array 302 and initializes the saturating counter contained in data characteristic field 316 of the associated entry 308 of cache directory 306 to 0b11. Thereafter, the process ends at block 530.

Referring now to block 520, in response to the memory access request hitting in cache directory 306, cache controller 320 determines whether the type of requested access corresponds to the currently identified data type of the target cache line. For example, cache controller 320 determines at block 520 whether the memory access request is a load request that hit in frequently read region 400*a* or a store request that hit in frequently written region 400*b*. If not, the process passes to block 524, which is described below. If, however, a positive determination is made at block 520, cache controller 320 provides the requested access to the target cache line, for example, by providing a copy of the target cache line to the requesting processor core 202 or by updating the target cache line in cache array 302 (block 522). In addition, cache controller 320 increments the saturating counter in the associated data characteristic field 318 (if the saturating counter is not already saturated at 0b11). Thereafter, the process terminates at block 530.

Referring now to block 524, in response to a negative determination at block 520 cache controller 320 provides the requested access to the target cache line and decrements the saturating counter in the associated data characteristic field 318. At block 526, cache controller 320 tests whether the saturating counter has reached a threshold value, for example, whether the most significant bit (MSB) of the decremented saturating counter is 0. If not, the process simply terminates at block 530. If, however, cache controller 320 determines at block 526 that the MSB of the saturating counter in data characteristic field 318 is 0, then cache controller 320 selects a swap cache line in the same congruence class belonging to the other region 400 and swaps the storage locations of the target cache line and the swap cache line and the corresponding directory entries 308 (block 528). Cache controller 320 also initializes the saturating counters of both cache lines to 11b. Thereafter, the illustrated method terminates at block 530.

It should be understood that the exemplary threshold employed at block 526 (i.e., MSB=0) is but one of a number of possible thresholds that can be utilized. For example, in other embodiments, the threshold can be set to other values of the saturating counter (e.g., 00b) or a different data characteristics detector can be utilized.

In the exemplary process depicted in FIG. 5, cache controller 320 manages the allocation and movement of cache lines in the various regions (in this case, a frequently read region and a frequently written region) based upon data characteristics (e.g., load versus store data) detected in hardware by cache controller 320. Alternatively or additionally, the detection of the data characteristics can be made by other processing unit hardware, such as a data prefetch engine that detects and propagates read streams and write streams in the access patterns of a processor core 202. In other embodiments, the data characteristics can be provided to cache controller 320 by software, for example, through compiler or programmer-determined bits in memory access requests and/or through information in the page table utilized to perform effective-to-real address translation and/or through special-purpose memory access instructions.

It should also be understood that the data movement policy depicted in FIG. 5 (in which data is moved within NUCA cache memory 300 on a cache hit if a discrepancy is noted between access type and data type) is exemplary and that other data movement policies can be implemented. For example, NUCA cache memory 300 could be implemented as an S-NUCA cache in which no intra-cache data movement is performed. Alternatively, cache controller 320 could implement a modified generational promotion scheme in which a cache line is moved to a lower latency entry of its congruence class on a load access, but not on a store access. Alternatively, cache controller 320 could implement a modified "move to the front" cache architecture in which cache line is moved to the lowest latency entry of its congruence class on a load access, but not on a store access. Alternatively, cache controller 320 can implement a more proactive data movement policy in which a store hit on a frequently written target cache line triggers cache controller 320 to swap the target cache line with a frequently read cache line in a higher latency entry, if any. These data movement policies are merely exemplary of the numerous policies that can be implemented in a NUCA cache memory as described and should not be taken as limiting the claimed invention.

As has been described, in at least one embodiment, a cache memory includes a cache array including a plurality of entries for caching cache lines of data, where the plurality of entries are distributed utilizing a common addressing scheme between a first region implemented in a first memory technology and a second region implemented in a second memory technology. The first and second regions have differing performance characteristics by virtue of the use of differing memory technologies. The cache memory further includes a common cache directory of contents of the cache array and a cache controller that controls operation of the cache memory.

While the present invention has been particularly shown as described with reference to one or more preferred embodiments, it will be understood by those skilled in the art that various changes in form and detail may be made therein without departing from the spirit and scope of the invention.

What is claimed is:

1. A cache memory for a data processing system including a lower level memory, the cache memory comprising:

a single integrated circuit chip, including:

a set-associative cache array including a plurality of congruence classes each associated with a respective one of a plurality of different possible values of an index portion of real memory addresses employed by the lower level memory, wherein the plurality of congruence classes each include a plurality of entries for caching cache lines of data retrieved from the lower level memory, wherein the plurality of entries within each of the plurality of congruence classes are distributed between a first region implemented in a first random access memory technology and a second region implemented in a second random access memory technology, wherein the first and second regions have differing performance characteristics as a consequence of differing memory technologies, and wherein the first random access memory technology has lower power consumption for read accesses than the second random access memory technology and the second random access memory technology has lower power consumption for store accesses than the first random access memory technology;

a common cache directory of contents of the set-associative cache array, the common cache directory including tags of the cache lines of data in the first region and tags of the cache lines of data in the second region, wherein the common cache directory includes multiple directory entries each storing information associated with a respective cache line in the cache array a data characteristic field that indicates data characteristics of the associated cache line of data, wherein the data characteristic field comprises a saturating counter; and a cache controller that controls operation of the cache memory, wherein the cache controller, responsive to a memory access request specifying a target cache line which does not reside in the cache array, implements an allocation policy that selects the first region for initially caching the target cache line in response to the memory access request being a load request and that selects the second region for caching the target cache line in response to the memory access request being a store request, and responsive to the memory access request specifying a target cache line which does reside in the cache array, increments the saturating counter of the target cache line when either the memory access request is a load request and the target cache line resides in the first region or the memory access request is a store request and the target cache line resides in the second region, and decrements the saturating counter of the target cache line otherwise.

2. The cache memory of claim 1, wherein:

each of the multiple directory entries includes a data characteristic field that indicates a data characteristic of the associated cache line of data;

the data characteristics include data criticality; and the cache controller implements a cache management policy that selects an entry in the first region to hold a particular cache line in response to the data characteristic field indicating the particular cache line is more critical and that selects an entry in the second region to hold the cache line in response to the data characteristic field indicating the particular cache line is less critical.

3. The cache memory of claim 2, wherein:

each directory entry, in addition to the data characteristic field, includes least recently used information indicating a relative access chronology of entries among the plurality of entries in the set-associative cache array and a coherence state field.

4. The cache memory of claim 2, wherein the cache controller implements an intra-cache data movement policy between the first and second regions based upon the data characteristic fields of the plurality of entries in the cache directory.

5. The cache memory of claim 1, wherein the first random access memory technology has lower read access latency than the second random access memory technology.

6. The cache memory of claim 1, wherein:

the single integrated circuit chip has at least first and second physical layers; and the first region is disposed in the first physical layer and the second region is disposed in the second physical layer.

7. The cache memory of claim 6, wherein the first physical layer is an upper layer and the second physical layer is a lower layer.

8. The cache memory of claim 1, wherein:

each of the multiple directory entries includes a data characteristic field that indicates a data characteristic of the associated cache line of data;

the data characteristics include whether the associated cache line is more frequently read or more frequently written; and the cache controller selects an entry in the first region to hold a particular cache line if the data characteristic field indicates the particular cache line is more frequently read and selects an entry in the second region to hold the particular cache line if the data characteristic field indicates the particular cache line is more frequently written.

9. A processing unit including the cache memory of claim 1 and a processor core coupled to access data within the cache memory.

10. The processing unit of claim 9, wherein the cache memory comprises a lower level cache memory and the processor core includes an upper level cache memory.

11. A data processing system comprising a plurality of processing units in accordance with claim 9, an interconnect fabric coupled to the plurality of processing units, and the lower level memory, wherein the lower level memory includes at least one system memory accessible by the plurality of processing units.

12. The cache memory of claim 1, wherein the cache directory is implemented in one of the first and second regions.

13. The cache memory of claim 1, wherein the cache controller dynamically adjusts sizes of the first and second regions according to data access characteristics.

14. A cache memory for a data processing system including a lower level memory employing real addresses, the cache memory comprising:

a set-associative cache array including a plurality of congruence classes each associated with a respective one of a plurality of different possible values of an index portion of real memory addresses employed by the lower level memory, wherein the plurality of congruence classes each include a plurality of entries for caching cache lines of data retrieved from the lower level memory, wherein the plurality of entries in each of the plurality of congruence classes are distributed among a plurality of tiles of physical memory physically distributed in a first physical layer and a different second physical layer of a single integrated circuit chip, wherein tiles in the first physical layer are implemented with a first random access memory technology and tiles in the second physical layer are implemented with a different second random access memory technology;

a common cache directory of the contents of the set-associative cache array, the common cache directory includes multiple directory entries each storing a data characteristic field that indicates data characteristics of the associated cache line of data, wherein the data characteristic field comprises a saturating counter; and a cache controller that controls operation of the cache memory, wherein:

the cache controller assigns tiles in the first physical layer to a first region that caches data having a data characteristic and assigns tiles in the second physical layer to a second region that caches data not having the data characteristic;

the cache controller dynamically changes assignment of a particular tile among the plurality of tiles between the first and second regions based on data access characteristics; and the cache controller accesses data in both the first and second physical layers utilizing a common real addressing scheme; and the cache controller responsive to a memory access request specifying a target cache line which resides in the cache array, increments the saturating counter of the target cache line when either the memory access request is a load request and the target cache line resides in the first region or the memory access request is a store request and the target cache line resides in the second region, and decrements the saturating counter of the target cache line otherwise.

15. The cache memory of claim 14, wherein:

the cache directory includes multiple directory entries each storing information associated with a respective cache line in the cache array;

each of the multiple directory entries includes a data characteristic field that indicates a data characteristic of the associated cache line of data;

the data characteristics include whether the associated cache line is more frequently read or more frequently written; and the cache controller selects an entry in the first region to hold a particular cache line if the data characteristic field indicates the particular cache line is more frequently read and selects an entry in the second region to hold the particular cache line if the data characteristic field indicates the particular cache line is more frequently written.

16. The cache memory of claim 15, wherein the first physical layer has a lower access latency than the second physical layer.

17. The cache memory of claim 15, wherein:

tiles in the first physical layer have lower power consumption for read accesses than tiles in the second physical layer.

18. The cache memory of claim 15, wherein:

tiles in the second physical layer have lower power consumption for store accesses than tiles in the first physical layer.

19. The cache memory of claim 15, wherein the cache controller, responsive to a memory access request specifying a target cache line, implements an allocation policy that selects between the first region and the second region as a location of an entry for caching the target cache line based upon a type of access to the target cache line requested by the memory access request.

20. The cache memory of claim 19, wherein the cache controller, responsive to a memory access request specifying a target cache line, implements an allocation policy that selects the first region for caching the target cache line in response to the memory access request being a load request and that selects the second region for caching the target cache line in response to the memory access request being a store request.

21. The cache memory of claim 15, wherein:

each of the multiple directory entries includes, in the addition to the data characteristic field, least recently used information indicating a relative access chronology of entries among the plurality of entries in the set-associative cache array and a coherence state field.

22. The cache memory of claim 15, wherein the cache controller implements an intra-cache data movement policy between the first and second regions based upon the data characteristic fields of the multiple directory entries in the cache directory.

23. The cache memory of claim 14, wherein:

tiles in the first physical layer have greater reliability than tiles in the second physical layer;

the data characteristic is data criticality; and the cache controller assigns tiles in the first physical layer to the first region and assigns tiles in the second physical layer to the second region.

24. The cache memory of claim 14, wherein the cache controller implements an allocation policy that selects between the first region and the second region as a location of an entry for caching a cache line based upon a characteristic of data within the cache line.

25. A processing unit including the cache memory of claim 14 and a processor core coupled to access data within the cache memory.

26. The processing unit of claim 25, wherein the cache memory comprises a lower level cache memory and the processor core includes an upper level cache memory.

27. A data processing system comprising a plurality of processing units in accordance with claim 25, an interconnect fabric coupled to the plurality of processing units, and at least one system memory accessible by the plurality of processing units.

28. The cache memory of claim 14, wherein the cache directory is implemented in one of the first and second regions.

* * * * *